United States Patent [19]

Mobasser

[11] Patent Number: 5,130,978
[45] Date of Patent: Jul. 14, 1992

[54] METHOD OF MANAGING TRAFFIC FLOWS IN A WIDEBAND INTEGRATED SERVICES DIGITAL NETWORK, AND A NETWORK FOR IMPLEMENTING THE METHOD

[75] Inventor: Bahman Mobasser, Maurepas, France

[73] Assignee: Alcatel CIT, Paris, France

[21] Appl. No.: 617,227

[22] Filed: Nov. 23, 1990

[30] Foreign Application Priority Data

Nov. 27, 1989 [FR] France ............................ 89 15551

[51] Int. Cl.⁵ .......................................... H04Q 11/00
[52] U.S. Cl. ...................................... 370/60; 370/94.1
[58] Field of Search ................... 370/44.1, 85.12, 62, 370/110.1, 60, 58.1

[56] References Cited

U.S. PATENT DOCUMENTS 4,965,790 10/1990 Nishino et al. ................... 370/85.12
5,012,466 4/1991 Buhrke et al. ........................ 370/62

FOREIGN PATENT DOCUMENTS 0275678 7/1988 European Pat. Off. .

OTHER PUBLICATIONS

A. S. Tanenbaum: "Computer networks", chapter 4, pp. 136-186, Prentice Hill Inc., Englewood, US; The data link layer.

I.E.E.E. Journal on Selected Areas in Communications, vol. 6, No. 9, Dec. 1988, pp. 1609-1616, IEEE, New York, N.Y., US; H. Onishi et al.: "Flow control schemes and delay/loss tradeoff in ATM network".

5th Annual International Phoenix Conference on Computers and Communications, Scottsdale, Ariz., Mar. 26-28, 1986, pp. 174-179, IEEE, N.Y., US; R. Jain: "Divergence of Timeout algorithms for packet retransmissions".

"Data and Computer Communications" William Stallings.

Primary Examiner—Benedict V. Safourek
Assistant Examiner—T. Samuel
Attorney, Agent, or Firm—Sughrue, Mion, Zinn, Macpeak & Seas

[57] ABSTRACT

Method and apparatus for controlling traffic flow in a wideband integrated services digital network including an asynchronous time division multiplexed switch network and a plurality of terminals operating at various data rates and providing different types of service. Control of traffic flow in the network is achieved by delaying data cells or allowing them to be lost, within limits that are predetermined as a function of the type of service provided by the terminals.

2 Claims, 1 Drawing Sheet

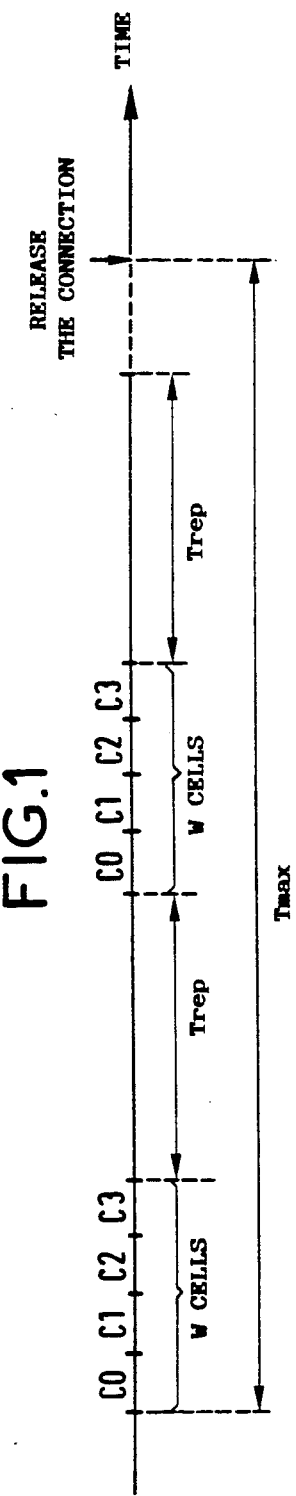
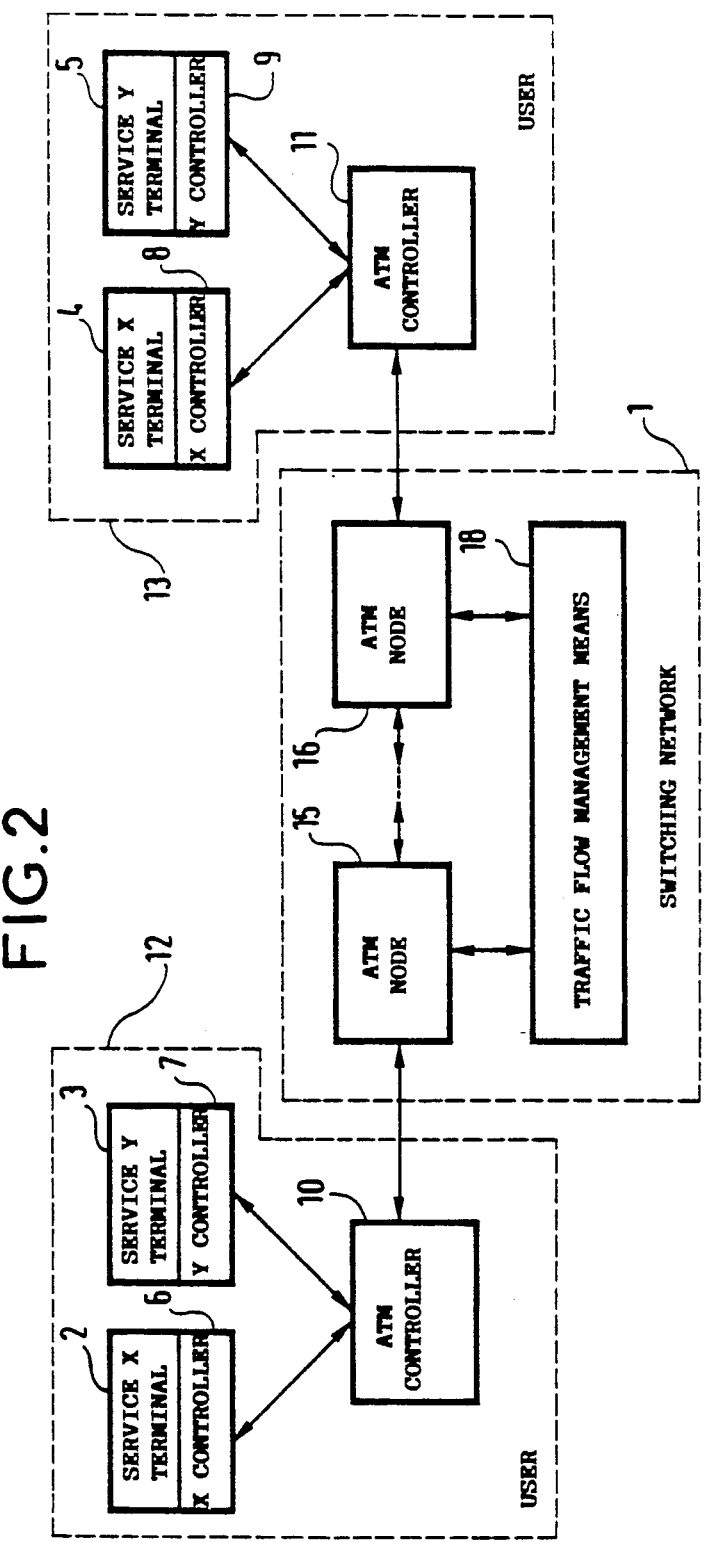

METHOD OF MANAGING TRAFFIC FLOWS IN A WIDEBAND INTEGRATED SERVICES DIGITAL NETWORK, AND A NETWORK FOR IMPLEMENTING THE METHOD

FIELD OF THE INVENTION

The invention relates to a method of managing traffic flows in an integrated services digital network, and to a network for implementing the method. Future integrated services networks will be wideband networks and will use asynchronous transfer mode as their only data transfer mode. Because it does not impose the constraints of a fixed data rate channel, this transfer mode has, in particular, the advantage of making it possible to add new applications that are as yet unknown. However, this type of network suffers from the drawback of causing data to be lost when congestion arises.

BACKGROUND OF THE INVENTION

The terminals of such a network transmit and receive data in the form of cells of fixed length. While cells are being transferred through the various nodes constituting the network, each cell is stored for a greater or lesser length of time in queues, and cells are lost when certain queues overflow. In order to avoid slowing down network operation, no provision has been made until now in the network itself for acknowledging reception of cells or for detecting the loss of cells. Because network management is so simple, very high data rates are possible, and these may reach 600 Mbits per second. Quality of service and the efficiency with which network resources are utilized vary as a function of resource requests, corresponding to various connections being established that share a set of resources in common.

Until now, this efficiency and this quality of service have been accepted as being adequate without it being necessary to provide traffic flow management within the network, because the vast majority of terminals taken into consideration up to the present deliver data at fixed rates. However, more and more applications, such as high definition television, are now being envisaged for which there could be very many terminals operating at data rates that are high and variable. If the majority of the data transmitted by an asynchronous time multiplexed network is at a variable data rate, it becomes necessary to consider regulating traffic flows in order to optimize resource utilization and quality of service.

Asynchronous transfer mode switching networks constitute merely a special case of packet switching networks. Prior art packet switching networks provide a highly specialized service, namely consulting data bases. Traffic flow through each connection is managed by making use of the flexibility in the data sources and receivers. This flexibility is achieved by storing data in buffer memories, with such storage being limited within tolerances defined by the transfer protocol used by the network.

A prior art protocol called X25 does not impose any particular method of managing traffic flows in a network, but when used at each node in the network it makes it possible to control the traffic flow over each connection. Each node is in full control of the data flow rate it receives from adjacent nodes. The network also controls data sources indirectly: each node is capable of regulating adjacent nodes and the regulation effect can thus propagate to the data source. Such a network includes a service controller at each inlet/outlet port in each node. This structure suffers from the drawback of limiting the data rates of connections since interchanges of service information between nodes take up time.

In so-called "frame relay" prior art networks, terminals include service controllers that apply a protocol called LAP-D There are no service controllers applying this protocol within the nodes of the network. Unlike networks using the X25 protocol, the nodes of the network cannot explicitly accept or reject frames. Because of this, the method of managing traffic flow uses certain functions of the service controllers in the terminals and applying the LAP-D protocol. The functions made use of are the following:

transmitting an acknowledgement whenever the terminal in question receives a call;

continuing to transmit cells after having transmitted a first cell and while waiting to receive an acknowledgement corresponding to the first cell, and limiting the number of cells transmitted while waiting to a predetermined number;

then suspending cell transmission during a predetermined duration if the acknowledgement is not received before the predetermined number of cells have been transmitted;

then retransmitting the first cell if the corresponding acknowledgement is not received during the predetermined duration;

and then releasing the connection occupied by the terminal under consideration if the acknowledgement is not received after a predetermined delay measured from the first transmission of the first cell.

The network can regulate the data traffic flow over a connection by delaying data frames or by eliminating them. These actions are tolerated by the terminal transmitting the data and by the terminal receiving the data. Their effect is to cause frames to be repeated and to give rise to periods during which no frames are transmitted, thereby having the overall effect of reducing the data rate and thus of reducing network congestion.

These known methods of managing traffic flows rely on tolerances defined by the values for the parameters as predetermined for the protocols X25 and LAP-D, respectively. These parameter values are determined as a function of data delays and data losses that can be tolerated on connections that are specialized in consulting data bases. However, depending on the type of service under consideration, the consequences of a delay or of a loss of data are not at all the same. Data base consultation does not tolerate any loss of data, but it tolerates data delay very well.

A telephone link cannot accommodate a delay of more than 100 ms, however it can accept the loss of a few packets of data without these packets being retransmitted. In contrast, a link transmitting television pictures can accept a delay of several seconds providing the delay between two predetermined terminal points is limited, with the terminals being provided with memory suitable for smoothing variations in delay. However the pictures transmitted may be very sensitive to data loss, particularly if the encoding method is a differential method that makes use of earlier pictures for decoding the current picture. Prior methods of managing traffic flows in a network are thus not directly usable in a wideband integrated services network using asynchronous transfers.

An object of the invention is to provide a method of managing traffic flows in a wideband asynchronous time multiplexed network integrating various types of service, with the method taking account of the type of service on each connection for the purpose of simultaneously optimizing resource utilization and quality of service, and with the method not requiring the use of service controllers at each node of the network.

SUMMARY OF THE INVENTION

The present invention provides a method of controlling traffic flows in an asynchronous time multiplexed network, the method consisting essentially in delaying data cells or in allowing them to be lost, within limits that are predetermined as a function of the type of service provided by the terminals interconnected by the connection under consideration.

According to the invention a method of managing traffic flows in a wideband integrated services digital network comprising an asynchronous time multiplexed switching network and a plurality of terminals operating at various data rates and providing different types of service said terminals transmitting and receiving data in the form of cells of fixed length and using a communications protocol adapted to asynchronous time multiplexing; consists, in each terminal, in:

transmitting an acknowledgement whenever the terminal in question receives a cell;

continuing to transmit cells after having transmitted a first cell and while waiting to receive an acknowledgement corresponding to the first cell, and limiting the number of cells transmitted while waiting to a predetermined number W;

then suspending cell transmission during a predetermined duration Trep if the acknowledgement is not received before all of the predetermined number W of the cells have been transmitted;

then retransmitting the first cell if the corresponding acknowledgement is not received during the duration Trep;

and then releasing the connection occupied by the terminal under consideration if the acknowledgement is not received after a predetermined delay Tmax measured from the first transmission of the first cell;

where the predetermined values for W, Trep, and Tmax are functions of the type of service provided by the terminal under consideration; and in the switching network, if close to congestion, in:

determining, for each connection, the values of the parameters W. Trep, and Tmax as a function of the type of service being provided by the terminals connected to the connection under consideration;

delaying a sequence of cells transmitted on each connection, while limiting the number of cells in said sequence to a number which is less than or equal to the predetermined number W; and loosing a cell and other identical cells transmitted on each connection, while limiting the duration corresponding to cell loss to a value less than the predetermined delay Tmax.

The invention also provides a network for implementing the above method.

BRIEF DESCRIPTION OF THE DRAWING

An embodiment of the invention is described by way of example with reference to the accompanying drawing, in which:

FIG. 1 is a timing diagram illustrating the protocol for transmitting data cells and for waiting for an acknowledgement; and FIG. 2 is a block diagram showing an embodiment of an integrated services digital network for implementing the method of the invention.

DETAILED DESCRIPTION OF THE PREFERRED EMBODIMENTS

A conventional asynchronous time multiplexed network does not include a traffic flow controlling protocol: a terminal transmits data cells so long as it has data to transmit. It does not expect any acknowledgement or any other message from the network. A terminal receiving data merely verifies the identifier of the virtual channel constituting the connection. All cells including a correct identifier are accepted without any acknowledgement or traffic flow control message being transmitted to the network or to the terminal transmitting the data.

According to the invention, a terminal receiving a cell transmits an acknowledgement for the terminal that transmitted the cell. The terminal that transmitted the cell receives the acknowledgement after a certain amount of transmission delay, and it deduces that the cell has been properly transmitted. Otherwise it performs a predetermined sequence of operations. Since each cell bears a number, a single acknowledgement can be transmitted for an entire sequence of cells. It is interpreted as acknowledging reception of all cells transmitted up to the cell corresponding to the acknowledgement.

FIG. 1 shows the situation when a terminal has transmitted a cell C0 and has not received an acknowledgement, as occurs, in particular, when the network delays the transmitted cell or causes it to disappear for the purpose of remedying a congestion state or a state close to congestion. The terminal continues to transmit data cells C1, C2, C3, while waiting to receive an acknowledgement corresponding to cell C0 or corresponding to one of the following cells. The number of cells transmitted during this waiting period and including the first cell C0 is limited to a predetermined number W which is equal to 4 in the present example.

The terminal then suspends cell transmission for a predetermined duration Trep if the acknowledgement has not been received before all W cells C0, . . . , C3 have been transmitted. It then transmits the first cell C0 again, followed by the cells C1, C2, and C3 if an acknowledgement corresponding to cell C0 is not received during the duration Trep.

Cells are retransmitted together with the pause of duration Trep several times over, measuring elapsed time from the beginning of the first transmission of the first cell C0. The method then consists in releasing the connection occupied by the terminal under consideration if the acknowledgement corresponding to cell C0 is not received within a predetermined maximum period Tmax. This period is chosen as a function of the maximum delay that can be tolerated for transmitting a data cell and for receiving an acknowledgement in reply over the network.

In each terminal, these functions are performed by a "service" controller which controls another controller whose function is to transmit and receive data in the form of cells of fixed length and using a protocol adapated to asynchronous time multiplexing. The parameters W, Trep, and Tmax are predetermined as a function of the type of service provided by the terminal under consideration.

For example, the parameter W is infinite for a telephone terminal since there is no need to wait for acknowledgement nor to repeat the transmission of a cell of lost data. For other types of service, W has a finite value of size depending on the tolerance to transmission delays of the type of service under consideration. This tolerance is deduced from the protocol used for segmenting messages in this type of service. The same applies to the selection of a predetermined value for Trep. The value Tmax corresponds to the maximum delay that can be tolerated for transmission from one terminal to another taking account of the service under consideration and observing that if the delay becomes unacceptable the only way out consists in abandoning the connection.

The management method within the network itself is described below.

FIG. 2 is a diagram showing one example of an integrated services digital network of the invention. It includes an asynchronous time multiplexed switching network 1 and two user equipments 12 and 13 given by way of example.

The equipment 12 includes two terminals 2 and 3 which are coupled to two respective "service" controllers 6 and 7 applying the above-described protocol for two respective services X and Y, e.g. telephone transmission and television picture broadcasting. The service controllers 6 and 7 are coupled to a common controller 10 referred to as an ATM controller which transmits and receives data in the form of cells using a processor adapted to the asynchronous time multiplexed switching network. The controller 10 is connected to a node 15 of the network 1.

The equipment 13 is analogous to the equipment 12. It includes two terminals 4 and 5 coupled to two respective service controllers 8 and 9 which apply the above-described protocol to two respective services X and Y. The service controllers 8 and 9 are coupled to a common controller 11 referred to as an ATM controller, which transmits and receives data in the form of cells using a protocol adapted to the time multiplexed switching network.

The network 1 is constituted by a sequence of "ATM" nodes 15, . . . , 16, and traffic flow management means 18 distributed among the nodes. Each ATM node 15, . . . , 16 already includes conventional control means for switching data cells as a function of labels and as a function of signalling signals. The means 18 are superposed on the conventional means and they supervise them. The management means 18 smooth traffic peaks by delaying cell transmission relative to mean traffic speed whenever the network is heavily loaded, and even by allowing some cells to be lost when the network is close to congestion. However, quality of service is kept constant by applying these actions of delaying or suppressing cells selectively. Some types of service cannot tolerate additional delays or losses of cells during traffic peaks whereas other types of service can tolerate either delays or losses of data.

For each connection, the management means 18 determine values for the parameters W, Trep, and Tmax as a function of the type of service being provided by the terminals interconnected by the connection under consideration. The type of service is known, for example, by means of information received when a terminal requests a connection to be set up. When the network is very heavily loaded, the means 18 save time by appropriately delaying a sequence of cells transmitted on each connection. The number of cells in the sequence is less than or equal to W. However, the means 18 limit the delay of each cell to the value Tmax. In the event of a telephone transmission, this is the only limit that matters, since the number W is infinite.

For example, in the case shown in FIG. 1, the management means 18 may delay transmission of the cells C0, C1, C2, and C3 by writing them to a queue and leaving them there at least until C3 has been received and written into the queue. The means 18 know that the transmitting terminal will automatically pause for a duration Trep because of the absence of an acknowledgement due to non-transmission of cell C0, i.e. due to the delay which is inflicted thereon by the network.

Naturally it is possible to save a shorter delay by storing a number of cells less than W.

When the network is even closer to congestion, the management means 18 resort to loosing data in order to save time by taking advantage of the fact that the transmitting terminal will repeat the pause of duration Trep several times, and also retransmit the cells C0, C1, C2, and C3. The management means 18 limit the duration corresponding to this loss of cells to a value lower than Tmax which is determined for the connection in question so as to prevent the service controller at the transmitting terminal breaking the link by releasing the connection.

By taking into account the values of the three parameters W, Trep, and Tmax specific to the type of service being provided on each connection at a given instant, it is possible to individualize the control of traffic flow over each connection, thereby preventing the network actually becoming congested, while avoiding severely degrading the quality of service for each type of service. For example, for a connection providing a telephone service, the number W is infinite and the duration Trep is infinite, which corresponds to there being no need for an acknowledgement and to lost cells not being repeated. The duration Tmax is equal to 100 ms. In contrast, for a connection providing a service in which television pictures are broadcast, the number W is equal to 20, the duration Trep is equal to 100 ms, and the duration Tmax is equal to 1 second, for example. When the network approaches congestion, the management means 18 can slow down the cells in connection providing telephone service by very little because of the tolerance Tmax equals 100 ms. However they can allow certain cells of these connections to be lost for a duration of less than Tmax=100 ms. In contrast, the management means 18 avoid loosing data on a picture transmission connection, but they may cause delays by storing sequences of 20 cells up to a maximum delay equal to Tmax=1 second.

The scope of the invention is not limited to the examples described above, and in particular a very wide range of types of service may be provided so long as values are specified for the parameters W, Trep, and Tmax, thereby enabling data cells to be delayed or eliminated without severely degrading the quality of service.

The use of a set of parameters having different values for each service is equivalent to treating a physical network as a juxtaposition of a plurality of virtual networks respectively corresponding to the difference services. Each single service virtual network corresponds to a given set of parameters W, Trep, and Tmax, and has its own specific reserved services. In practice, services having similar traffic characteristics may be grouped together in the same virtual network, i.e. in the some set of parameters W, Trep, and Tmax.

I claim:

1. A method of managing traffic flows in a wideband integrated services digital network comprising an asynchronous time division multiplexed switching network and a plurality of terminals operating at various data rates and providing different types of service, the terminals transmitting and receiving data in the form of cells of fixed length and using a communications protocol adapted to asynchronous time division multiplexing; wherein, in each terminal, said method comprises:

transmitting an acknowledgement whenever a particular terminal receives a cell;

continuing to transmit cells after having transmitted a first cell and while waiting to receive an acknowledgement corresponding to the first cell, and limiting the number of cells transmitted while waiting to a predetermined number;

then suspending cell transmission during a predetermined duration if the acknowledgement is not received before all of the predetermined number of the cells have been transmitted;

then retransmitting the first cell if the corresponding acknowledgement is not received during the predetermined duration;

and then releasing the connection occupied by said particular terminal if the acknowledgement is not received after a predetermined delay measured from the first transmission of the first cell;

wherein the predetermined values for the predetermined number, the predeterimined duration and the predetermined delay are functions of the type of service provided by said particular terminal;

and wherein, in the switching network, if close to congestion, said method comprises:

determining, for each connection, the values of the predetermined number, the predetermined duration and the predetermined delay as a function of the type of service being provided by the terminate connected to said each connection;

delaying a sequence of cells transmitted on said each connection, while limiting the number of cells in said sequence to a number which is less than or equal to the predetermined number; and loosing a cell and other identical cells transmitted on said each connection, while limiting the duration corresponding to cell loss to a value less than the predetermined delay.

2. A wideband integrated services digital network comprising an asynchronous time division multiplexed switching network and a plurality of terminals operating at various data rates and providing different types of service, wherein each terminal is coupled to first means for receiving and transmitting data in the form of cells of fixed length in accordance with a communications protocol adapted to asynchronous time division multiplexing, and to second means controlling the first means, said second means comprises:

means for transmitting an acknowledgement whenever a particular terminal receives a cell;

means for continuing to transmit data cells after having tansmitted a first cell and while waiting to receive an acknowledgement corresponding to the first cell, and limiting the number of cells transmitted while waiting to a predetermined number which is a function of the type of service provided by said particular terminal;

means for then suspending cell transmission during a predetermined duration if the acknowledgement is not received before all of the predetermined number of the cells have been transmitted, the predetermined duration being a function of the type of service provided by said particular terminal;

means for then retransmitting the first cell if the corresponding acknowledgement is not received during the predetermined duration;

means for then releasing the connection occupied by said particular terminal if the acknowledgement is not received after a predetermined delay measured from the first transmission of the first cell, the predetermined delay being a function of the type of service provided by said particular terminal; and wherein the switching network includes management means, said management means comprising:

means for determining the values of the predetermined number, the predetermined duration and the predetermined delay on each connection as a function of the type of service provided by the terminals interconnected by said each connection;

means for, if the network is very heavily loaded, delaying a sequence of cells transmitted over said each connection while limiting the number of cells in the sequence to the predetermined number and while limiting the delay to the predetermined delay; and means for, if the network is close to congestion, loosing a cell and other identical cells retransmitted as a consequence by the terminal which transmitted the cell, while limiting the duration corresponding to cell loss to a value less than the predetermined delay.

* * * * *